(12) United States Patent
Hosur et al.

(10) Patent No.: US 7,003,016 B1
(45) Date of Patent: Feb. 21, 2006

(54) MAXIMUM LIKELIHOOD TIMING SYNCHRONIZERS FOR SAMPLED PSK BURST TDMA SYSTEM

(75) Inventors: Srinath Hosur, Plano, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/417,233

(22) Filed: Oct. 13, 1999

Related U.S. Application Data (60) Provisional application No. 60/104,099, filed on Oct. 13, 1998.

(51) Int. Cl.
H04L 27/30 (2006.01)

(52) U.S. Cl. .................... 375/145; 375/149; 375/355; 375/364; 370/514

(58) Field of Classification Search ............... 375/145, 375/169, 261, 279, 326, 329, 340, 355, 362, 375/364, 365, 367; 329/304, 306, 365, 346; 370/509–575, 520

See application file for complete search history.

(56) References Cited

U.S. PATENT DOCUMENTS

| | | | | |
|---|---|---|---|---|
| 4,888,793 A | * | 12/1989 | Chanroo et al. | 329/306 |
| 5,170,415 A | * | 12/1992 | Yoshida et al. | 329/304 |
| 5,640,125 A | * | 6/1997 | Alard | 329/306 |
| 5,694,434 A | | 12/1997 | Burke | 375/340 |
| 5,732,105 A | * | 3/1998 | Andren et al. | 329/304 |
| 5,963,603 A | * | 10/1999 | Li et al. | 375/341 |
| 6,104,237 A | * | 8/2000 | Mabuchi | 329/307 |
| 6,154,487 A | * | 11/2000 | Murai et al. | 375/150 |
| 6,307,696 B1 | * | 10/2001 | Bishop et al. | 360/51 |

OTHER PUBLICATIONS

"Maximum Likelihood Timing Synchronizers for Sampled PSK Burst TDMA Systems", Dabak, et al., IEEE *Transactions on Communications, International Conference, Conf. Record* vol. 2 of 2, 1997, pp 686-692.

*Synchronization Problems in PAM Systems*, Marc Moeneclaey, IEEE Transactions on Communications, vol. Com-28, No. 8, Aug. 1980, pp. 1130-1136.

"Timing Recovery in Digital Subscriber Loops", Agazzi, et al., IEEE Transactions on Communications, vol. Com-33, No. 6, Jun. 1985, pp. 558-569.

"Carrier and Symbol Synchronization", John G. Proakis, Ph.D., P.E., Digital Communications, Third Edition, Department of Electrical & Computer Engineering, Northeastern University, '95, Chapter 6, pp. 333-373.

"*Communications: Changing The Way We Work And Play*", Globecom '97, Communication Theory Mini-Conference, IEEE Global Telecommunications Conference, Nov. 1997.

"*Interpolation in Digital Modems—Part I: Fundamentals*", Floyd M. Gardner, IEEE Transactions on *Communications*, vol. 41, No. 3, Mar. 1993, pp. 501-507.

"*Interpolation in Digital Modems—Part II: Implementation and Performance*", Lars Erup, et al., IEEE *Transactions On Communications*, vol. 41, No. 6, Jun. 1993, pp. 998-1008.

(Continued)

*Primary Examiner*—Dac V. Ha
(74) *Attorney, Agent, or Firm*—Ronald O. Neerings; Wade James Brady, III; Frederick J. Telecky, Jr.

(57) ABSTRACT

A method of producing a correction signal includes receiving a predetermined data sequence (500). The data sequence is sampled at predetermined times, thereby producing a sampled data sequence (522, 532). The sampled data sequence is separated into first and second sampled data sequences. A ratio is calculated (550, 558) from the first and second sampled data sequences. A correction signal is produced (556, 564) in response to the ratio.

22 Claims, 6 Drawing Sheets

OTHER PUBLICATIONS

"*Joint Carrier Phase and Symbol Timing Recovery for PAM Systems*", Meyers, et al., IEEE Transactions on *Communications*, vol. Com-28, No. 8, Aug. 1980, pp. 1121-1129.

"*Line Equalizer for a Digital Subscriber Loop Employing Switched Capacitor Technology*", Suzuki, et al., IEEE Transactions on Communications, vol. Com-30, No. 9, Sep. 1982, pp. 2074-2082.

"*Maximum Likelihood Timing Synchronizers for Sampled PSK Burst TDMA Systems*", Dabak, et al., IEEE Transactions on Communications, International Conference, Conf. Record vol. 2 of 2, 1997, pp 686-692.

*Synchronization Problems in PAM Systems*, Marc Moeneclaey, IEEE Transactions on Communications, vol. Com-28, No. 8, 08/08, pp. 1130-1136.

"*Timing Recovery in Digital Subscriber Loops*", Agazzi, et al., IEEE Transactions on Communications, vol. Com-33, No. 6, 06/85, pp. 558-569.

\* cited by examiner

MAXIMUM LIKELIHOOD TIMING SYNCHRONIZERS FOR SAMPLED PSK BURST TDMA SYSTEM

This application claims the benefit of U.S. Provisional Application No. 60/104,099, filed Oct. 13, 1998.

FIELD OF THE INVENTION

This invention relates to time division multiple access (TDMA) for a communication system and more particularly to a method for synchronizing carrier phase and symbol timing in a mobile receiver.

BACKGROUND OF THE INVENTION

Present time division multiple access (TDMA) systems are characterized by simultaneous transmission of different data signals over a common channel by assigning each signal a unique time period. These data signals are typically transmitted as binary phase shift keyed (BPSK) or quadrature phase shift keyed (QPSK) data symbols during such unique time periods. These unique periods are allocated to a selected receiver to determine the proper recipient of a data signal. Allocation of such unique periods establishes a communication channel between a transmitter and selected remote receivers for narrow band transmission. This communication channel may be utilized for cable networks, modem transmission via phone lines or for wireless applications.

A selected TDMA receiver must determine both carrier phase and symbol timing of its unique period from the received signal for data recovery. The carrier phase is necessary for generating a reference carrier with the same phase as the received signal. This reference carrier is used to coherently demodulate the received signal, thereby creating a baseband signal. Symbol timing synchronization of the receiver with the transmitter is necessary for the receiver to extract correct data symbols from the baseband signal.

Figure 1:
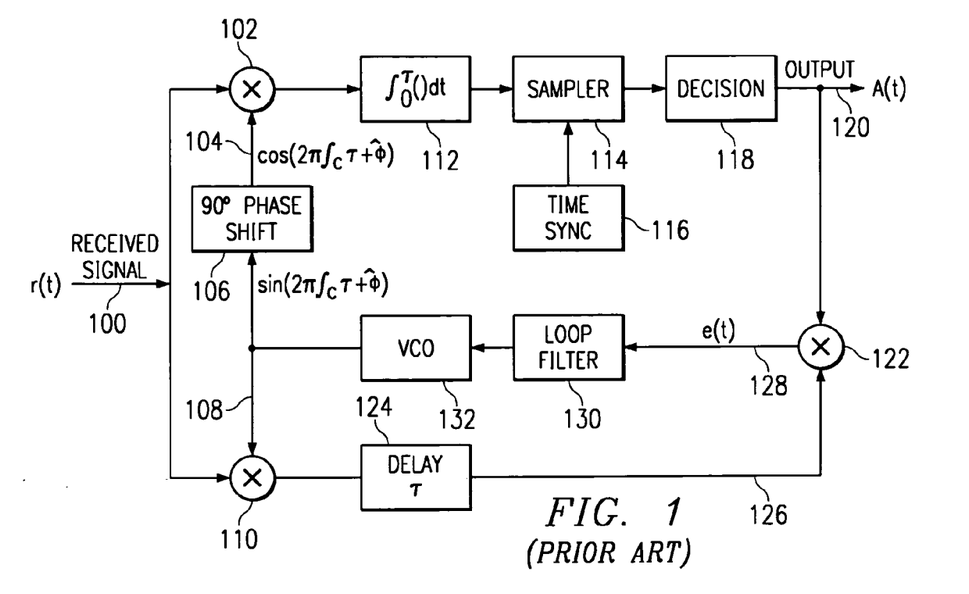
FIG. 1 is a block diagram of a carrier recovery phase-locked loop circuit of the prior art.

Previous studies, such as J. G. Proakis, *Digital Communications* 347–350 (1995), have utilized decision-directed phase locked loops (PLL) to estimate carrier phase. An exemplary decision-directed phase-locked loop (PLL) circuit of the prior art is shown at FIG. 1. The circuit receives baseband signal r(t) at lead 100. Respective quadrature carriers at leads 104 and 108 developed from voltage-controlled oscillator (VCO) circuit 132 are multiplied by the received signal. The product signal is integrated over symbol time T by integrator 112 and sampled by circuit 114 according to the symbol time base circuit 116. Decision circuit 118 produces output signal A(t) at lead 120. A product signal from multiplier circuit 110 is delayed by circuit 124 to compensate for the decision circuit delay. The signals at leads 120 and 126 are multiplied by circuit 122 to produce error signal e(t) at lead 128. This error signal is filtered by loop filter circuit 130 to eliminate double frequency components and applied to VCO circuit 132. Problems with the PLL circuit of FIG. 1 when used for phase estimation, however, include circuit complexity and likelihood of hangup. Furthermore, the circuit of Proakis requires synchronization circuitry to correctly sample each symbol near the center of the respective symbol time.

Figure 2:
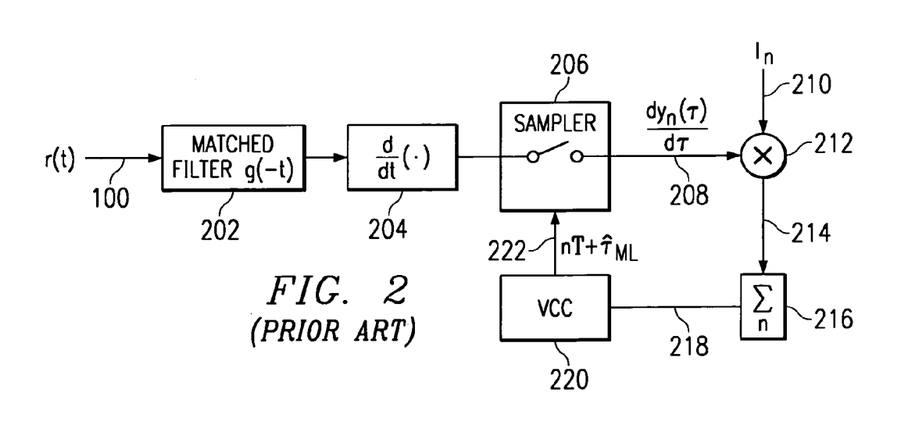
FIG. 2 is a block diagram of a symbol time recovery circuit of the prior art.

Other studies determine maximum likelihood (ML) estimates for symbol timing by calculating a derivative of a matched filter output signal. Id. at 359–361. Referring to FIG. 2, there is, a circuit of the prior art that receives baseband signal r(t) on lead 100. The baseband signal is filtered by matched filter 202. Circuit 204 then calculates a derivative of the signal, which is then sampled by circuit 206 according to voltage-controlled clock (VCC) circuit 220. Circuit 212 then multiplies the derivative at lead 208 by the known symbol sequence $I_n$ at lead 210. The product of this multiplication is summed by circuit 216 and applied to the VCC circuit 220. A limitation of this circuit, however, is that calculation of a matched filter output derivative for symbol timing synchronization is not possible with modern digital receivers which work on sampled data input signals. Another study by L. E. Franks, *Carrier and Bit Synchronization in Data Communication-A Tutorial Review*, IEEE Trans. on Communications, August 1980 1107, 1117, teaches a method for joint tracking of both carrier phase and symbol timing. Therein (FIG. 9), Franks teaches a circuit that combines a PLL for carrier phase determination and a circuit to calculate a derivative of a low pass filter output. This method, therefore, is subject to the same limitations of the previously discussed methods.

SUMMARY OF THE INVENTION

These problems are resolved by a method of producing a correction signal by receiving a predetermined data sequence. The data sequence is sampled at predetermined times, thereby producing a sampled data sequence. The sampled data sequence is separated into first and second sampled data sequences. A ratio is calculated from the first and second sampled data sequences. A correction signal is produced in response to the ratio.

The present invention improves reception and reduces circuit complexity by providing maximum likelihood carrier phase and symbol timing correction signals. The method improves bit error rate compared to methods of the prior art and is comparable to the Cramer-Rao bound.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 3A:
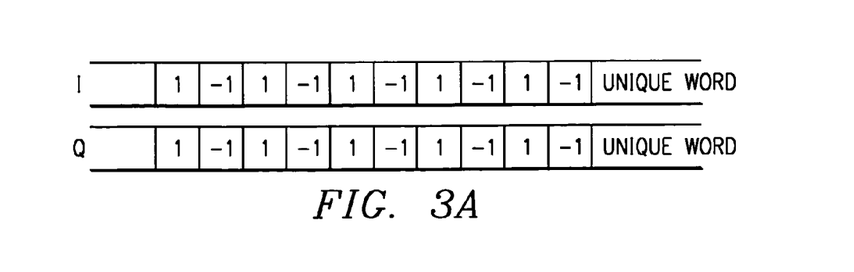
FIG. 3A is a sequence of training data that may be used for timing and carrier phase recovery.
Figure 5:
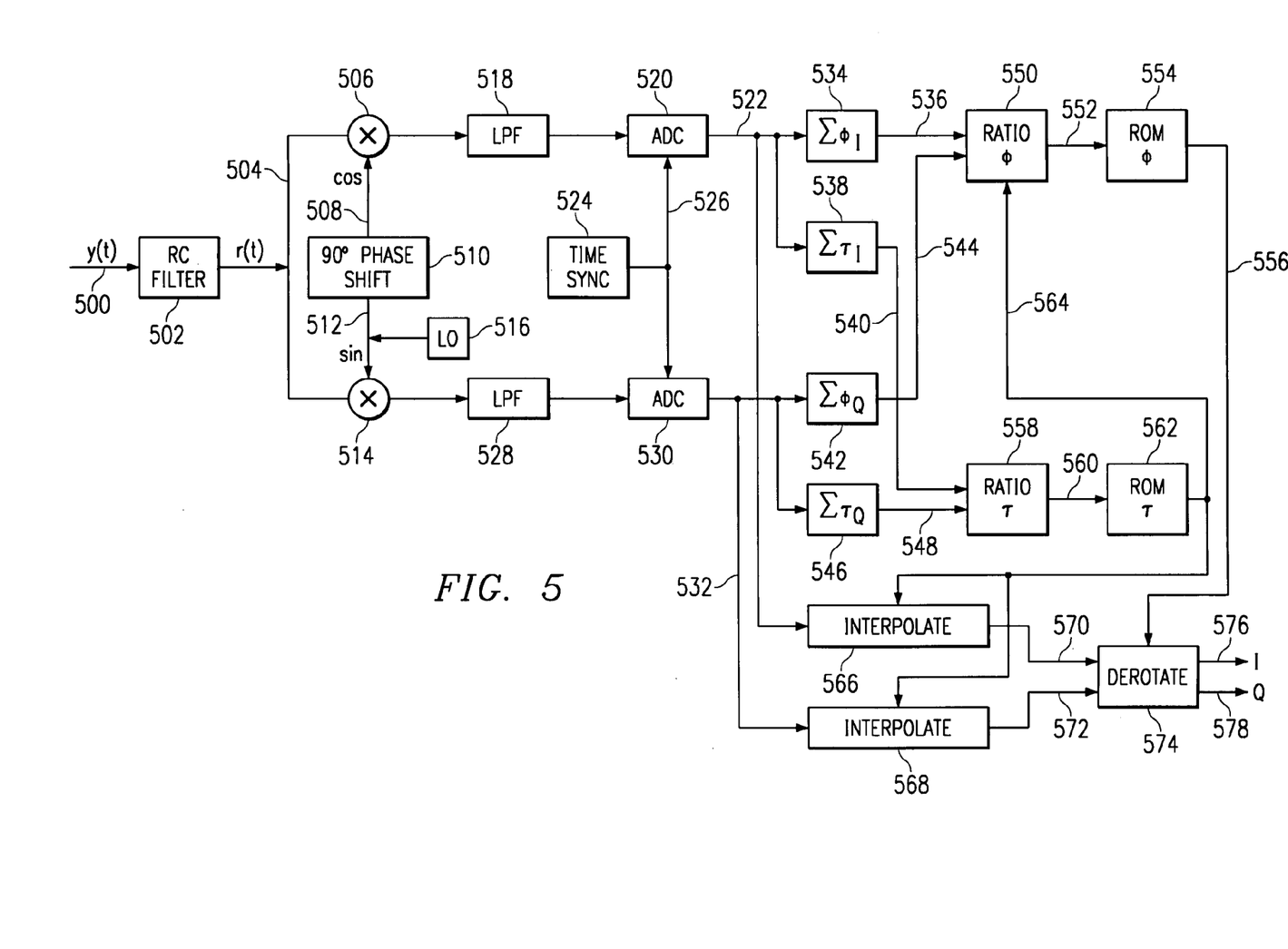
FIG. 5 is a block diagram of the carrier phase and symbol timing correction circuit of the present invention.

Referring now to FIG. 5, a received baseband signal y(t) given by equation [1] is applied to lead 500. This baseband signal is preferably a quadrature phase shift keyed (QPSK) signal of discrete symbols received from a remote base station transmitter. Input signal samples $I_i$ include in-phase (I real) and quadrature (Q imaginary) components of the sampled training data of FIG. 3A.

Figure 3B:
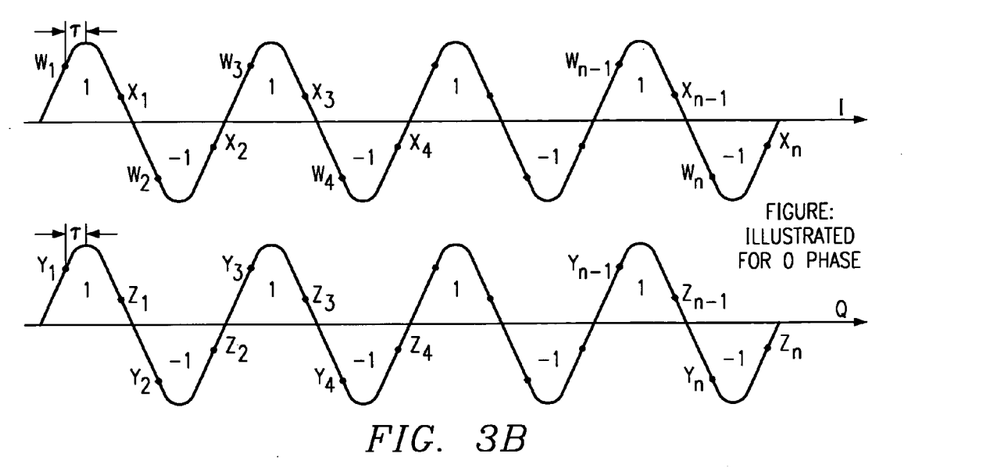
FIG. 3B is a diagram showing full and half sample sequences for I and Q signals corresponding to the training data of FIG. 3A.

This training data is a sequence of unique data words transmitted as a preamble or midamble by the remote base station to the receiver. Referring to FIG. 3B, the samples are designated full samples $w_i$ and $y_i$ of the I and Q components and half samples $x_i$ and $z_i$ of the I and Q components, respectively, for the training data sequence { . . . (1+j),−(1+j),(1+j),−(1+j), . . . }. By convention, the full samples are assumed near the center of the symbol time T and the half samples are assumed near a boundary between symbols. Samples of the received signal are treated as an infinite series for purposes of the following discussion.

$$y(t) = \sum_{i=-\infty}^{i=\infty} I_i g(t - iT - \tau)e^{j\phi} + n(t) \qquad [1]$$

Figure 4:
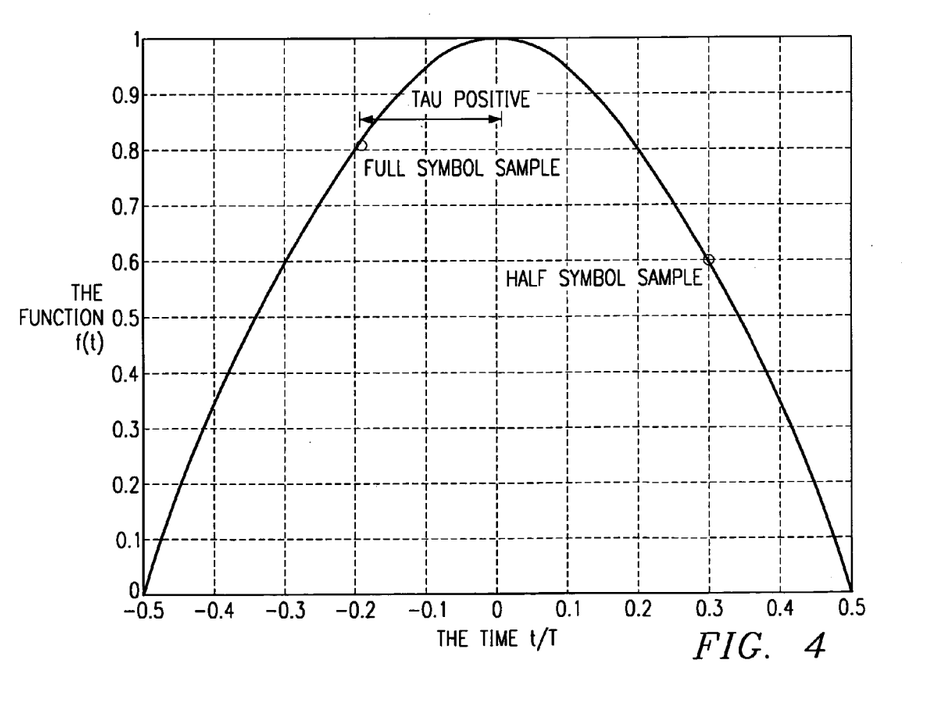
FIG. 4 is a diagram showing full and half signal sample values at the output terminal of a raised cosine (RC) filter.

The received baseband signal is filtered by a transmit pulse shaping filter 502 having a filter characteristic g(t) and having a shaping factor of $\alpha \geq 0.2$. Simulations show small degradation of finite-length sequences compared to idealized infinite-length sequences with this shaping factor constraint. The filter is typically a square root raised cosine (RC) filter having a characteristic as in FIG. 4. The output of the RC filter is given in equation [2]. Both carrier phase $\phi$ and symbol timing $\tau$ must be determined from samples of the received signal to recover the I and Q components of the signal transmitted by the base station. The symbol timing error of FIG. 4 showing a positive value for $\tau$, indicates the time of the full sample prior to the center of the symbol time t/T. The range of $\tau$ is determined by $(2i-1)/2 \leq (t-\tau)/T \leq (2i-1)/2$, having an absolute value of $\tau \leq T/2$, where T is the symbol time period. The filter function of FIG. 4 is given by equation [3] where $-T/2 \leq t \leq T/2$.

$$r(t) = r_I(t) + jr_Q(t) = (I_i^I + jI_i^Q)f(t - iT - \tau)e^{j\phi} + N(t) \qquad [2]$$

$$f(t) = \sum_{i=-\infty}^{i=\infty} I_i^I h(t - iT) \qquad [3]$$

The received signal is applied to multiplier circuits 506 and 514. A free-running local oscillator circuit 516 produces a reference carrier signal on lead 512. This reference carrier is multiplied by the received signal to produce a quadrature signal that is applied to low pass filter circuit 528. A time synchronization circuit 524 produces a clock signal on lead 526 having twice the frequency of the symbol frequency transmitted signal from the base station. This clock signal on lead 526 is applied to analog-to-digital converter (ADC) circuit 530. The ADC takes two samples of the quadrature signal corresponding to each symbol period T and produces a digital sample on lead 532 given by equation [4]. Likewise, the ADC circuit 520 takes two samples of the in-phase signal corresponding to each symbol period T and produces a digital sample on lead 522. The samples on either of lead 522 and 532, therefore, include sample sequences given by equations [5] and [6], corresponding to full-symbol and half-symbol samples and their respective noise terms.

$$r(l) = I_i f(lT_S - iT - \tau)e^{j\phi} + N(l) \qquad [4]$$

$$r^f(l) = I_l f(-\tau)e^{j\phi} + N^f(l) \qquad [5]$$

$$r^h(l) = I_l f(T_S - \tau)e^{j\phi} + N^h(l) \qquad [6]$$

Operation of sum circuits 534, 538, 566 and 568 and ratio circuits 550 and 558 will now be explained in detail. If the received signal is rewritten as a vector R including full and half samples as in equation [7], then the mean or expected value E[R] of these samples after filtering is given by equation [8]. Furthermore, the covariance H is given by equation [9]. The matrix I is an L×L unity matrix. The matrix B is an L×L correlation matrix with elements having an expected value given by $\beta_{jk} = h(2(j-k)+1)T_S)$, j, k=0, . . . ,L−1, where the function h(t)=g(t)*g(−t) is the RC filter response. The superscript *T in the following discussion denotes a conjugate transpose or Hermitian matrix.

The matrix inversion lemma of equation [10] is applied to equation [9] to produce inverted covariance matrix $H^{-1}$ in equation [11], where $\Gamma = (I-BB^{*T})^{-1}$ and $\Psi = (I-B^{*T}B)^{-1}$.

$$R[r^f(0), r^f(1), \ldots, r^f(L-1), r^h(0), r^h(1), \ldots, r^h(L-1)] \qquad [7]$$

$$E[R] = [[I_0, I_1, \ldots, I_{L-1}]f(-\tau), [I_0, I_1, \ldots, I_{L-1}]f(T_S - \tau)]e^{j\phi} \qquad [8]$$

$$H = E[(R-E[R])^{*T}(R-E[R])] = N_0 \begin{vmatrix} I & B^{*T} \\ B & I \end{vmatrix} \qquad [9]$$

$$(I - B^{*T}B)^{-1} = I + B^{*T}(I - BB^{*T})^{-1}B \qquad [10]$$

$$H^{-1} = \begin{vmatrix} I + B^{*T}\Gamma B & -B^{*T}\Gamma \\ -B\Psi & I + B\Psi B^{*T} \end{vmatrix} \qquad [11]$$

The maximum likelihood (ML) estimate of $\phi$ is a value that satisfies equation [12]. Thus, the real part of the partial derivative in equation [13] must also be equal to zero. Since received vector R is independent of $\phi$, its partial derivative is zero resulting in equation [14]. A substitution of equations [11] and [14] into equation [13] produces equation [15].

$$\frac{\partial}{\partial \phi}\left((R - E[R])H^{-1}(R - E[R])^{*T}\right) = 0 \qquad [12]$$

$$R\left\{\left(\frac{\partial}{\partial \phi}(R - E[R])\right)H^{-1}(R - E[R])^{*T}\right\} = 0 \qquad [13]$$

$$-\frac{\partial}{\partial \phi}E[R] = -j[[I_0, I_1, \ldots, I_{L-1}]f(-\tau), \qquad [14]$$

$$[I_0, I_1, \ldots, I_{L-1}]f(T_S - \tau)e^{j\theta} = -jE[R]$$

$$R\left\{-j\left(\frac{\partial}{\partial \phi}E[R]\right)\begin{vmatrix} I + B^{*T}\Gamma B & -B^{*T}\Gamma \\ -B\Psi & I + B\Psi B^{*T} \end{vmatrix}(R - E[R])^{*T}\right\} = 0 \qquad [15]$$

A simplification of equation [16] is applied to equation [15], thereby producing equation [17]. This simplification is appropriate, since sums of respective full and half samples of known training data alternate between +1 and −1. Thus, for large L, matrix products $[I_0, \ldots, I_{L-1}]B \approx 0$ and $[I_0, \ldots, I_{L-1}]B^T \approx 0$.

$$E[R]H^{-1} = \frac{E[R]}{N_0} \begin{vmatrix} I + B^{*T}\Gamma B & -B^{*T}\Gamma \\ -B\Psi & I + B\Psi B^{*T} \end{vmatrix} \approx \frac{E[R]}{N_0} \begin{vmatrix} I & 0 \\ 0 & I \end{vmatrix} = \frac{E[R]}{N_0} \quad [16]$$

$$\Re\{-jE[R]R^{*T}\} = 0 \quad [17]$$

Sum circuits 534, and 542 calculate respective I and Q sums for $\phi$ according to equation [18], where $I_l = I_l^1 + jI_l^Q$, $A,B \in \{I,Q\}$, and $D \in \{f,h\}$. Thus, real and imaginary values of variables on the right side of equation [18] are indicated by I and Q subscripts, respectively. Substitution of equation [7] and [8] in summation form of equation [18] for respective matrices R and expected value E[R] yields equation [19]. Equation [19] is rewritten as equation [20] to further explain circuit operation. Ratio circuit 550 receives respective I and Q sums on leads 536 and 544. The ratio circuit also receives current values for $f(\hat{\tau})$ and $f(T_S-\hat{\tau})$ on lead 564 as will be explained in detail. The ratio circuit 550 then calculates the ratio on the right side of equation [20] and applies the calculated ratio to lead 552. The ROM lookup table 554 receives the calculated ratio on lead 552 and responsively produces carrier phase estimate $\phi$ on lead 556.

$$S_{AB}^D = \sum_{l=0}^{L-1} r_A^D(l) I_{Bl}^D \quad [18]$$

$$\sin\phi\{f(-\tau)(S_{II}^f + S_{QQ}^f) + f(T_S - \tau)(S_{II}^h + S_{QQ}^h)\} - \cos\phi\{f(-\tau)(S_{QI}^f + S_{IQ}^f) + f(T_S - \tau)(S_{QI}^h + S_{IQ}^h)\} = 0 \quad [19]$$

$$\tan\phi = \frac{f(-\tau)(S_{QI}^f + S_{IQ}^f) + f(T_S - \tau)(S_{QI}^h + S_{IQ}^h)}{f(-\tau)(S_{II}^f + S_{QQ}^f) + f(T_S - \tau)(S_{II}^h + S_{QQ}^h)} \quad [20]$$

The desired ML estimate for $\tau$ is the value that satisfies equation [21] The real part of equation [21], therefore, must also be satisfied according to equation [22]. Substitution of equation [23] and the previously discussed simplification of equation [24] yields equation [25]. A further substitution of received matrix R full and half samples into equation [25] yields equation [26].

$$\frac{\partial}{\partial \tau}\left((R - E[R])H^{-1}(R - E[R])^{*T}\right) = 0 \quad [21]$$

$$\Re\left\{\left(\frac{\partial}{\partial \tau}(R - E[R])\right)H^{-1}(R - E[R])^{*T}\right\} = 0 \quad [22]$$

$$\frac{\partial}{\partial \tau}(R - E[R]) = \quad [23]$$
$$-j[[I_0, I_1, \ldots, I_{L-1}]f'(-\tau), [I_0, I_1, \ldots, I_{L-1}]f'(T_S - \tau)]e^{j\theta}$$

$$\left(\frac{\partial}{\partial \tau} E[R]\right) H^{-1} \approx \frac{1}{N_0}\left(\frac{\partial}{\partial \tau} E[R]\right) \begin{vmatrix} I & 0 \\ 0 & I \end{vmatrix} = \frac{1}{N_0} \frac{\partial}{\partial \tau} E[R] \quad [24]$$

-continued $$f'(-\hat{\tau}) \quad [25]$$
$$\left[-(S_{II}^f - S_{QQ}^f)\cos\phi + (S_{IQ}^f - S_{QI}^f)\sin\phi - \sum_{l=0}^{L-1} |I_l|^2 f(-\hat{\tau})\right] +$$
$$f'(T_S - \hat{\tau})\left[-(S_{II}^h - S_{QQ}^h)\cos\phi + (S_{IQ}^h - S_{QI}^h)\sin\phi - \sum_{l=0}^{L-1} |I_l|^2 f(T_S - \hat{\tau})\right] = 0$$

$$\text{noise} + [f'(-\hat{\tau})f(-\tau) + f'(T_S - \hat{\tau})f(T_S - \tau)] - \quad [26]$$
$$[f'(-\hat{\tau})f(-\hat{\tau}) + f'(T_S - \hat{\tau})f(T_S - \hat{\tau})] = 0$$

Figure 6:
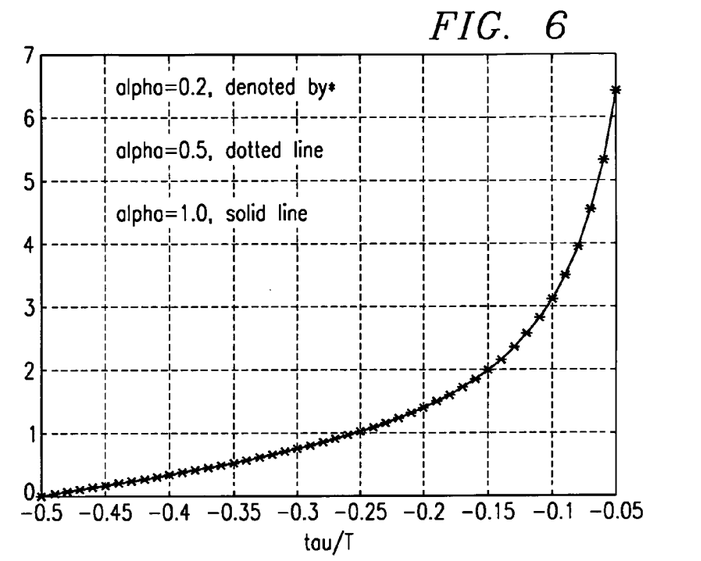
FIG. 6 is a diagram of the data in ROM lookup table 562 of FIG. 5.
Figure 7A:
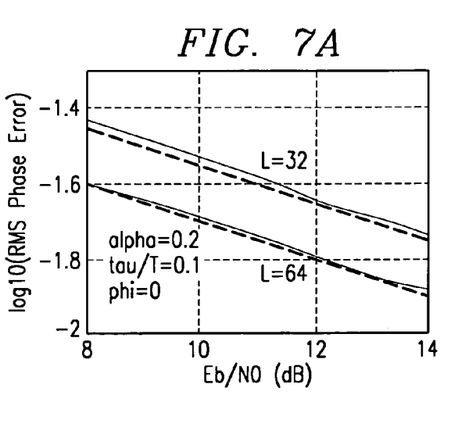
FIGS. 7A–7D are simulations of the ML carrier phase estimate for various parameters compared to the Cramer-Rao bound.
Figure 7B:
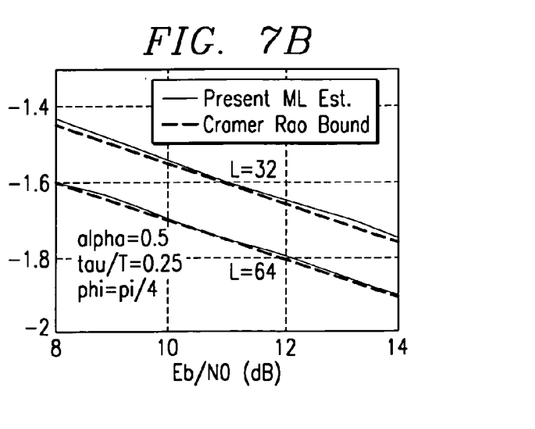
Figure 7C:
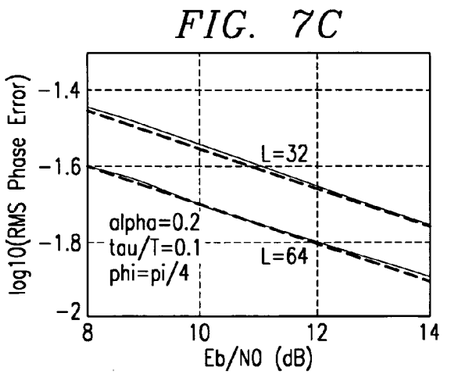
Figure 7D:
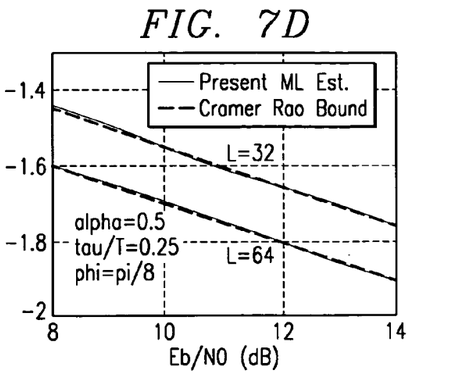

The terms $f'(-\hat{\tau})f(-\hat{\tau}) + f'(T_S - \hat{\tau})f(T_S - \hat{\tau})$ of equation [26] are small and may be neglected. A further simplification of equation [26], given in equation [27], is possible for RC filters having a shaping factor $\alpha \geq 0.2$ as previously described. This simplification yields equation [28]. Sum circuits 538 and 546 calculate respective symbol timing sums as previously described for the carrier phase estimate. The ratio circuit 558 receives these sums on leads 540 and 548 and calculates the ratio in the center term of equation [28]. The function $q(-\hat{\tau})$, defined by equation [30], is substituted into equation [28] and yields quadratic equation [30]. This quadratic equation has one positive and one negative real root. The positive real root corresponds to the desired ML estimate for $\tau$. This positive real root is calculated by ratio circuit 558 and applied to ROM lookup table 562 via lead 560. The contents of ROM lookup table 562 correspond to values of the function $q(-\hat{\tau})$ in FIG. 6. The ROM lookup table produces the corresponding $\tau$ on lead 564.

$$\frac{\partial}{\partial \tau}(f^2(-\tau) + f^2(T_S - \tau)) = \quad [27]$$
$$f'(-\tau)f(-\tau) + f'(T_S - \tau)f(T_S - \tau) \approx 0$$

$$\frac{f(-\hat{\tau})}{f(T_S - \hat{\tau})} - \frac{f(T_S - \hat{\tau})}{f(-\hat{\tau})} = \quad [28]$$
$$\frac{(S_{II}^f + S_{QQ}^f)^2 - (S_{II}^h + S_{QQ}^h)^2 +}{(S_{IQ}^f + S_{QI}^f)^2 - (S_{IQ}^h + S_{QI}^h)^2} \equiv \Delta$$
$$\frac{(S_{II}^f + S_{QQ}^f)(S_{II}^h + S_{QQ}^h) + (S_{IQ}^f + S_{QI}^f)(S_{IQ}^h + S_{QI}^h)}$$

$$q(-\hat{\tau}) = \frac{f(-\hat{\tau})}{f(T_S - \hat{\tau})} \quad [29]$$

$$q^2(-\hat{\tau}) - \Delta q(-\hat{\tau}) - 1 = 0 \quad [30]$$

Interpolate circuits 566 and 568 receive respective I and Q signal samples on leads 522 and 532 together with the ML symbol estimate corresponding $\tau$ on lead 564. The interpolate circuits correct the symbol timing of the signal samples according to the ML estimate of $\tau$ and produce corrected I and Q signal samples on leads 570 and 572, respectively. Derotate circuit 574 receives the corrected signal samples together with the ML carrier phase estimate $\phi$ on lead 556. The derotate circuit produces phase corrected I and Q signal samples on leads 576 and 578, respectively, in response to the ML carrier phase estimate ϕ.

Figure 8A:
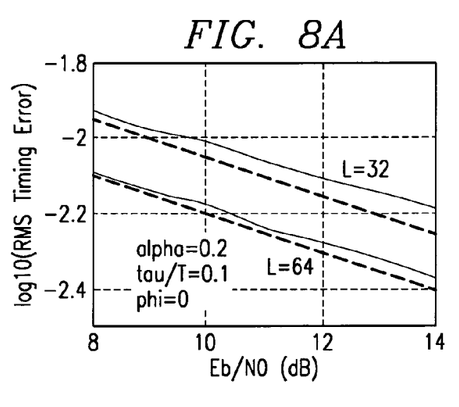
FIGS. 8A–8D are simulations of the ML symbol timing estimate for various parameters compared to the Cramer-Rao bound.
Figure 8B:
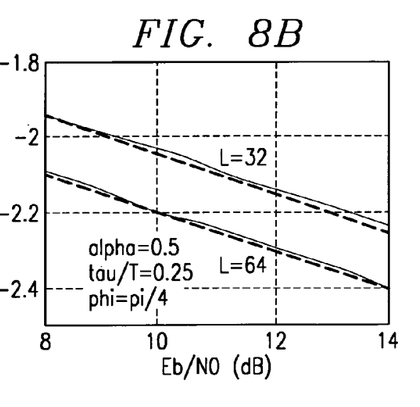
Figure 8C:
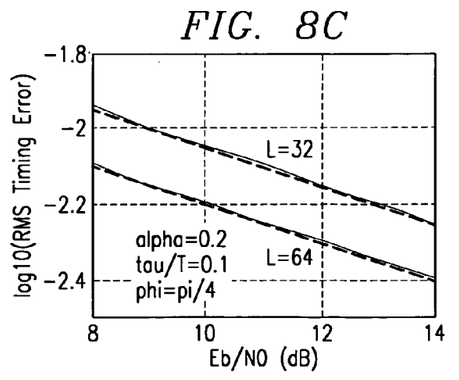
Figure 8D:
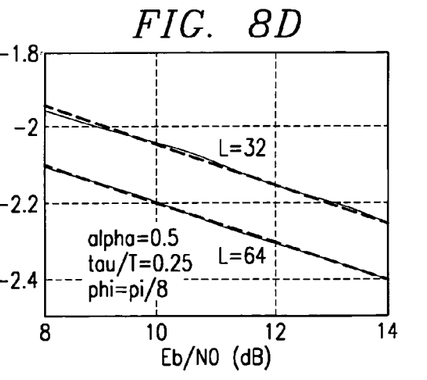
Figure 9A:
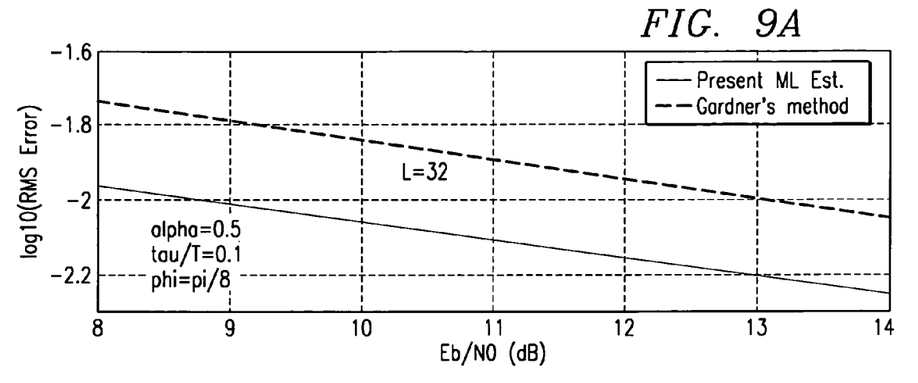
FIGS. 9A–9B are simulations of the RMS error of the present ML estimate compared to Gardner's method.
Figure 9B:
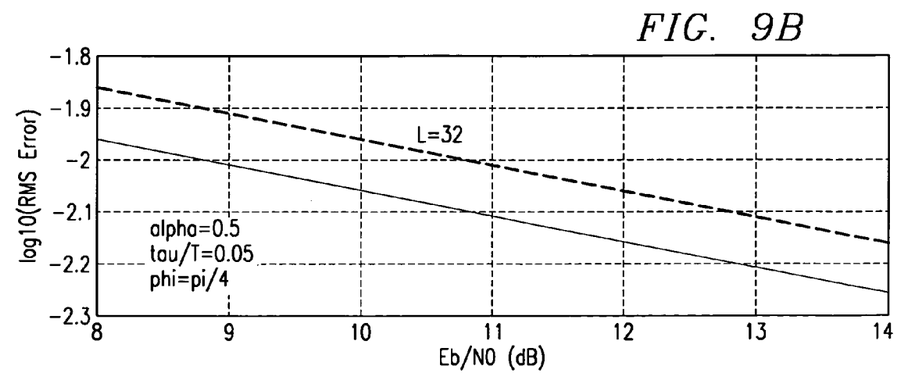

Turning now to FIGS. 7A–7D, there are Monte-Carlo simulations of the ML carrier phase estimate of the present invention for various parameters compared to the Cramer-Rao bound. The Cramer-Rao bound is significant as a theoretical limit. The upper curves in each simulation show a 32-sample sequence compared to a 64-sample sequence. The 64-sample sequence improves the bit error rate by approximately 3 dB for each parameter set. Each simulation, however, shows performance of the present ML estimator is very close to the Cramer-Rao bound. Referring to FIG. 8A–8D, corresponding Monte-Carlo simulations of the ML symbol timing estimate show approximately the same result. The worst-case difference of symbol timing estimate of FIG. 8A shows the present ML error is within 0.5 dB of the Cramer-Rao bound. Finally, referring to FIGS. 9A–9B, performance of the present ML estimator is compared to Gardner's method, presented in Gardner, *A BPSK/QPSK timing-error detector for sampled receivers*, IEEE Trans. on Communications, May 1986, at 423. The simulation of FIG. 9A for α=0.5, τ/T=0.1 and ϕ=π/8, shows a 4 dB improvement over Gardner's method. The simulation of FIG. 9B for α=0.5, τ/T=0.05 and ϕ=π/4, including a smaller symbol time error and a larger carrier phase error, shows a 2 dB improvement over Gardner's method.

The ML estimates of the present invention are highly advantageous with respect to methods of the prior art for several reasons. First, the bit error rate of the present ML estimate is substantially lower than previous methods. Second the present invention resolves all ambiguities of sampled data. Positions of the full and half data samples are inconsequential to the present method and long as the positive root of equation [30] is selected. Third, the present invention avoids the complexity of PLL circuits of the prior art and avoids hangup. Finally, the ML estimate signals are derived from a ratio of signal samples. Thus, they are insensitive to signal strength and do not require automatic gain control (AGC).

Although the invention has been described in detail with reference to its preferred embodiment, it is to be understood that this description is by way of example only and is not to be construed in a limiting sense. For example, the present invention may be easily applied to a BPSK system of alternating ones and zeros for the in-phase component and zero for the quadrature component. Moreover, many functions the present invention may be performed by a digital signal processor or other processor as will be understood by those of ordinary skill in the art having access to the present specification.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A method of producing a correction signal, comprising the steps of:
   receiving a predetermined data sequence;
   sampling the data sequence at predetermined times, thereby producing a sampled data sequence;
   separating the sampled data sequence into first and second sampled data sequences;
   calculating a ratio from the first and second sampled data sequences; and
   producing a correction signal in response to the ratio.

2. A method as in claim 1, wherein the predetermined data sequence comprises a predetermined number of alternating ones and zeros.

3. A method as in claim 1, wherein the first sampled data sequence comprises even-numbered samples and wherein the second sampled data sequence comprises odd-numbered samples.

4. A method as in claim 1, wherein the predetermined data sequence comprises a predetermined sequence of data symbols.

5. A method as in claim 4, wherein the predetermined sequence of data symbols comprises a sequence of complex symbols from the series 1+j, −1−j, 1+j, −1−j, . . . , −1−j.

6. A method as in claim 5, further comprising the step of separating the sampled data sequence into in-phase and quadrature components, wherein the first and second sampled data sequences are sampled from each of the in-phase and quadrature components.

7. A method as in claim 1, wherein the correction signal comprises a carrier phase correction signal.

8. A method as in claim 1, wherein the correction signal comprises a symbol timing correction signal.

9. A method as in claim 1, wherein the step of producing the correction signal comprises selecting a predetermined value from a lookup table in response to the ratio.

10. A method, comprising the steps of:
    receiving a predetermined sequence of data symbols, each data symbol having a predetermined period;
    producing at least two samples of each data symbol during the predetermined period;
    adding a first of the at least two samples of each data symbol, thereby producing a first sum;
    adding a second of the at least two samples of each data symbol, thereby producing a second sum;
    calculating a ratio from the first sum and the second sum; and
    producing at least one correction signal in response to the ratio.

11. A method as in claim 10, wherein the predetermined data sequence of data symbols comprises a predetermined number of alternating ones and zeros.

12. A method as in claim 11, wherein the alternating ones and zeros comprise a sequence of complex symbols from the series 1+j, −1−j, 1+j, −1−j, . . . , −1−j.

13. A method as in claim 11, further comprising the step of separating the predetermined data sequence of data symbols into in-phase and quadrature components, wherein the first and second samples are sampled from each of the in-phase and quadrature components.

14. A method as in claim 10, wherein the first of the at least two samples comprises even-numbered samples and wherein the second of the at least two samples comprises odd-numbered samples.

15. A method as in claim 10, wherein the correction signal comprises a carrier phase correction signal.

16. A method as in claim 10, wherein the correction signal comprises a symbol timing correction signal.

17. A method as in claim 10, wherein the step of producing the correction signal comprises selecting a predetermined value from a lookup table in response to the ratio.

18. A method as in claim 10, wherein the data symbols are quadrature phase shift keyed data symbols.

19. A method, comprising the steps of:
    receiving a predetermined sequence of data symbols, eachdata symbol having a predetermined period;

producing at least two samples of each data symbol during the predetermined period;

adding a first of the at least two samples of each data symbol, thereby producing a first sum;

adding a second of the at least two samples of each data symbol, thereby producing a second sum;

calculating a first ratio from the first sum and the second sum;

calculating a second ratio different from the first ratio from the first sum and the second sum;

producing a symbol timing correction signal in response to the first ratio; and producing a carrier phase correction signal in response to the second ratio.

20. A method as in claim 19, wherein the predetermined data sequence of data symbols comprises a predetermined number of alternating ones and zeros.

21. A method as in claim 20, wherein the alternating ones and zeros comprise a sequence of complex symbols from the series 1+j, −1−j, 1+j, −1−j, . . . , −1−j.

22. A method as in claim 19, further comprising the step of separating the predetermined data sequence of data symbols into in-phase and quadrature components, wherein the first and second samples are sampled from each of the in-phase and quadrature components.

* * * * *